Jan. 24, 1928. I. KLEIN ET AL Re. 16,858

FASTENING DEVICE

Original Filed Oct. 16, 1923

WITNESSES

Olive H. Holmes

INVENTORS

Irving Klein and

BY Samuel Hammer

C. P. Hofel

ATTORNEY

Reissued Jan. 24, 1928. Re. 16,858

UNITED STATES PATENT OFFICE.

IRVING KLEIN AND SAMUEL HAMMER, OF BROOKLYN, NEW YORK, ASSIGNORS, BY MESNE ASSIGNMENTS, TO WESTINGHOUSE ELECTRIC & MANUFACTURING COMPANY, A CORPORATION OF PENNSYLVANIA.

FASTENING DEVICE.

Original No. 1,551,311, dated August 25, 1925, Serial No. 668,959, filed October 10, 1923. Application for reissue filed August 25, 1927. Serial No. 215,488.

This invention relates to fastening devices and more particularly to a simply constructed and easily operated device for quickly and securely fastening two parts or members to each other.

It is the primary object and purpose of our present improvements to provide a fastening device of the above-character which is primarily designed for the purpose of securing the metal trim or cover plate upon the open side of the electric panel board box after the latter has been mounted in its permanent position in a wall structure. However, it will be clearly understood as this description proceeds that our invention is readily adaptable to numerous other analogous uses. In one proposed embodiment of our improvements we provide a locking member adapted to be engaged upon one side of the metal trim or cover plate, and means operable from the opposite side of said plate and connected with the locking member whereby the latter may be positioned in engagement with a flange or other fixed part upon which said plate is to be secured and then subsequently adjusted into tight clamping engagement with such flange whereby the two parts are rigidly fixed against relative movement.

It is another object of our invention to provide a means in a device of this character which will operate to effectively prevent the casual movement of said locking member from its locking position, thus obviating the possible loosening of the locking means and relative shifting of the parts connected thereby.

With the above and other objects in view, the invention consists in the improved fastening device and in the form, construction and relative arrangement of its several parts as will be hereinafter more fully described, illustrated in the accompanying drawings and subsequently incorporated in the subjoined claims.

In the drawing wherein we have illustrated one practical and satisfactory embodiment of the invention and in which similar reference characters designate corresponding parts throughout the several views.

Figure 1:
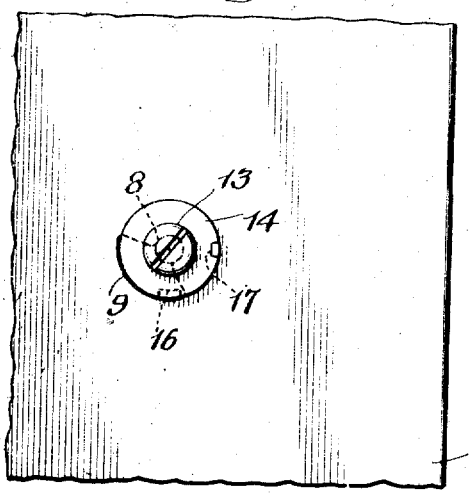
Figure 1 is a front elevation showing our device as applied to the metal trim or cover plate and before adjustment to its final locking position.

In the present instance we have selected for purposes of illustration an embodiment of our invention as preferably employed for the purpose of detachably locking or securing the metal trim or cover plate upon the open side of an electrical panel board box or casing. Such illustration, however, implies no limitations upon the possible utility of our invention since it is manifest that the device is applicable to numerous other uses, either in the form illustrated, or in other alternative embodiments thereof. It will, therefore, be understood that our invention is of more or less general application and use for the purpose of securely fastening or locking together two detachable parts. In the drawing, one of these parts is shown in the form of an angle bar 5, one flange of which is fixed to the inner face of a marginal wall 6 of the box or casing. The panel board carrying the switches and fuse plug receptacles is suitably mounted within this box or casing. It is the practice to secure the metal trim or cover plate upon the casing after mounting the latter in the wall structure. Not infrequently, due to the carelessness of the workmen, in arranging and securing the box or casing in position, its walls will be somewhat distorted. As a consequence thereof, it is not possible to properly register the openings in the cover plate with the openings in the flange of the box wall which receive the fastening bolts or screws. Accordingly, considerable difficulty is experienced in properly attaching and securing the metal trim or cover plate upon the walls of the box structure. Applicants' improvements obviate this difficulty and permit of the easy, quick and secure attachment of the metal trim or cover plate in its applied position. To this end we provide the cover plate 7 at suitably spaced points with a series of bolt or screw receiving openings 8 each of which communicates with a sector-shaped opening 9 of relatively large area.

The locking member 10 as herein shown is in the form of an elongated channel shaped bar having parallel longitudinally extending flanges 11. The intermediate portion of this bar is centrally formed with an internally threaded boss 12 with which the screw 13 has loose threaded engagement. In spaced relation to said boss longitudinally of the member 10 an opening 12′ is formed therein.

Figure 7:
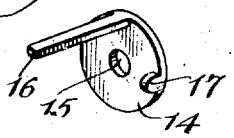
Figure 7 is a detail perspective view of one of the parts.
Figure 6:
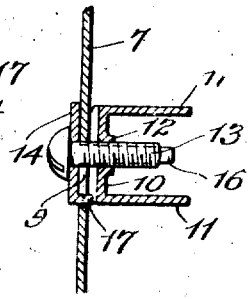
Figure 6 is a vertical section taken on the line 6—6 of Figure 4.

As shown in Figure 7 of the drawing, the adjusting element for the locking member 10 consists of a metal disc 14 having a central opening 15 therein to receive the screw 13. Upon one side of this disc at the edge thereof a laterally extending arm 16 is formed and in spaced relation to said arm a lug 17 projects from the same face of said disc at the edge thereof.

Figure 2:
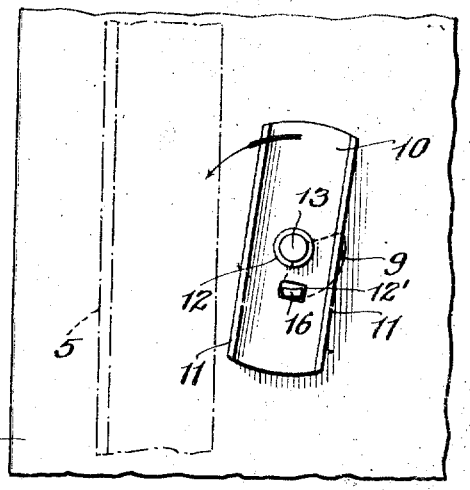
Figure 2 is an elevation of the reverse side of the cover plate showing the initial relative position of the elements.
Figure 3:
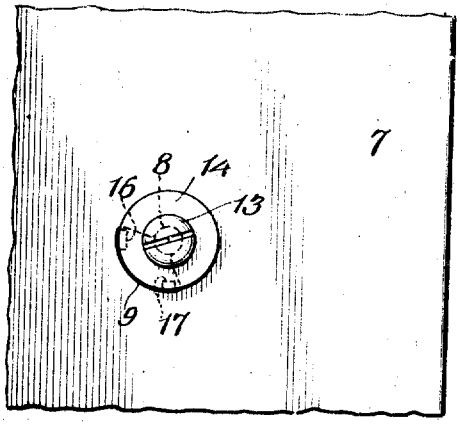
Figure 3 is a view similar to Figure 1, illustrating the fastening device in its final locking position.
Figure 4:
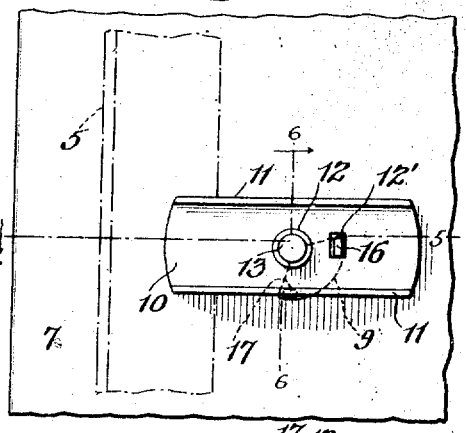
Figure 4 is a view similar to Figure 2; the parts of the device being shown in locking position.
Figure 5:
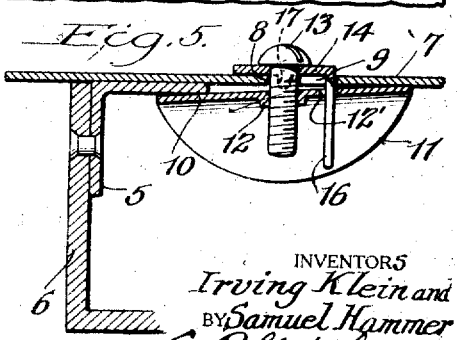
Figure 5 is a horizontal section taken on the line 5—5 of Figure 4.

In the application and use of our fastening device the locking member 10 is first arranged upon the inner side of the metal trim or cover plate 7 and after engaging the adjusting element 14 upon the screw 13, said screw is inserted from the opposite side of said plate through the opening 8 and is threaded in the boss 12 of the locking member. In this connection of the screw to the locking member, the arm 16 on the element 14 passes through the sector-shaped opening 9 of the cover plate and through the opening 12′ in the locking member, while the lug 17 of the element 14 bears against the face of the plate 7. In applying the cover plate the screw 13 is turned and the locking member 10 positioned as seen in Figure 2 so that it extends in the lengthwise direction of the edge of said plate. The plate 7 is then arranged with its marginal portion bearing against the inwardly extending flanges of the angle bars 5 on the box walls as seen in Figure 5 of the drawings. The movement of the member 10 to proper position as shown in Figure 2, to permit of the engagement of the plate 7 upon the angle bars is limited by contact of the arm 16 with one edge of the opening 9 in the cover plate. After the plate 7 has been arranged in its proper position, the disc adjusting element 14 is turned so as to move the locking member 10 to a position substantially at right angles to the flange of the angle bar 5 and with one end of said member engaged over the inwardly extending flange of said angle bar. The arm 16 contacting with the opposite end edge of the opening 9 as shown in Figure 3 limits the movement of the locking member 10 to the latter position. At the same time the lug 17 on the element 14 will enter the opposite end of said opening. The screw 13 is now turned and threaded inwardly through the boss 12 and the head of the screw bearing against the element 14 thus drawing the locking member to the position seen in Figure 5, with one end thereof contacting against an inner face of the plate 7, while the other end thereof is tightly clamped upon the inner side of the flange of the angle bar 5. The arm 16 and the lug 17 being positioned in the opposite ends of the opening 9 and side arm extending through the opening 12′ in the locking member, effectually prevents any casual rotation of the locking member upon the screw 13 whereby said member might become disengaged from the flange on the angle bar. Thus it will be apparent that after the several fastening devices carried by the metal trim or cover plate 7 have been properly adjusted as above explained, said plate will be securely and rigidly held in its fixed position relative to the walls of the box or casing. By the elimination of registering openings in the plate 7 and the angle bar flange as heretofore provided, we are enabled to properly and securely fix the cover plate in its applied position, although said flanges on the box walls might be somewhat distorted from their original condition in the process of mounting the box or casing in the wall structure.

From the foregoing description considered in connection with the accompanying drawing, the construction, manner of use and several advantages of our invention will be readily understood. It will be observed that the several parts of the device are of very simple form so that they can be produced in large quantities at small cost. It will also be seen that the use of our improvements involves no material changes in the form or construction of the parts to be fastened or connected thereby. We have above described a particular construction of the locking member, but it will be understood that this member as well as the other elements of the device are susceptible of minor modifications which may be necessary or desirable in order to permit of the adaptation of the device to other analogous uses. Therefore, while we have herein illustrated and described a desirable and practical embodiment of our improvements, the same may also be incorporated in numerous other alternative constructions within the spirit and scope of the appended claims.

We claim as our invention:

1. A fastening device comprising a locking member adapted to be arranged upon one side of a part to be fastened, and means for adjusting and securing said member in locking engagement with a second part, said means including a screw to extend through an opening in the first named part and having threaded connection with said locking member, and an element mounted upon said screw and coacting with the locking member to prevent turning movement of the latter relative to said first part.

2. A fastening device comprising a locking member adapted to be arranged upon one side of a part to be fastened, and means for adjusting and securing said member in locking engagement with a second part, said means including a screw to extend through an opening in the first named part and having threaded connection with said locking member, and an element mounted upon said screw having means coacting with said first named part to prevent turning movement of said element with respect to the first part and said means also including a part coacting with the locking element to prevent turning movement of the latter from its locking position.

3. In combination with the parts to be fastened, one of said parts having a screw receiving opening and a sector-shaped opening communicating therewith, a locking member adapted to be arranged upon one side of said part and having a threaded opening therein, a screw insertable from the opposite side of said part through said screw receiving opening and engaged with the threaded opening of said locking member, and an element engaged upon said screw and having a part extending through the sector shaped opening and coacting with the locking member to prevent turning movement of the latter from its locking position.

4. In combination with the parts to be fastened, one of said parts having a screw receiving opening and a sector shaped opening communicating therewith, a locking member adapted to be arranged upon one side of said part and having a threaded opening therein, a screw insertable from the opposite side of said part through said screw receiving opening and engaged with the threaded opening of said locking member whereby said member may be moved into clamping engagement with another said part, and an element loosely engaged upon said screw having an arm to extend through said sector shaped opening and also provided with a lug adapted to engage in said opening, said lug and arm preventing the turning movement of said element in either direction with respect to one of the said parts and said arm coacting with the locking element for moving the latter to and from its locked position.

5. A fastening device for two parts one of which is movable and is adapted to be fastened with respect to the other, comprising an oblong locking member pivoted to the inner side of the movable part and adapted to be turned so as to have an end thereof overlapping the inner side of the other or fixed part, means for turning said oblong locking member from the outside of the two parts, and cooperating with the movable part for preventing the locking member from turning when it has been turned to locking position.

6. A fastening device comprising a locking member adapted to be arranged upon one side of a part to be fastened, and means for adjusting and securing said member in locking engagement with a second part, said means including a screw having threaded connection with said locking member and extending through an opening in the first named part and operable for fastening the locking member on the reverse side of said first part from said locking member, and an element mounted upon the said screw and the reverse side of said part from the locking member and having projections extending through the part coacting with the locking member to prevent turning movement of the latter relative to said first part.

7. A fastening device comprising a locking member adapted to be arranged upon one side of a part to be fastened, and means for adjusting and securing said member in locking engagement with a second part, said means including a screw having threaded connection with said locking member and extending through an opening in the first named part and operable for fastening the locking member on the reverse side of said first part from said locking member and an element mounted upon said screw on the reverse side of said part from the locking member, having means extending through the part coacting with said first named part to prevent turning movement of said element with respect thereto and said means also including a part coacting with the locking element to prevent turning movement of the latter from its locking position.

8. The combination with a support and a cover therefor, of a clamp member pivotally mounted on the interior of the cover for engaging the support, means operable from the outer side of the cover for operating the clamp member, and means operable from the outer side of the cover for rotating the clamp.

9. A clamp for connecting a pair of members comprising a device pivotally mounted on one side of one member and engaging the other member, means operable from the other side of the first said member for moving the device into and out of engagement with the second said member, and another means operable from the said other side of the first member for rotating the device.

10. A cover clamp comprising a clamp member mounted on one side of the cover and movable about two angularly disposed axes, and separate means operable from the other side of the cover for moving the clamp member about either respective axis.

In testimony whereof, we have hereunto subscribed our names.

IRVING KLEIN.
SAMUEL HAMMER.